(12) United States Patent
Singh et al.

(10) Patent No.: US 11,411,402 B1
(45) Date of Patent: Aug. 9, 2022

(54) SYSTEMS AND METHODS FOR OPTIMIZING ENERGY DEMAND WITH ENERGY AVAILABILITY SHAPES, THROUGH INPUTS, INCENTIVIZATION AND DISPLAY

(71) Applicant: Aquila IP, LLC, Dover, DE (US)

(72) Inventors: Harish P. Singh, Lincoln, NE (US); Rina Singh, New York, NY (US)

(73) Assignee: Aquila IP, LLC, Dover, DE (US)

( * ) Notice: Subject to any disclaimer, the term of this patent is extended or adjusted under 35 U.S.C. 154(b) by 0 days.

(21) Appl. No.: 16/657,877

(22) Filed: Oct. 18, 2019

Related U.S. Application Data

(60) Provisional application No. 62/850,124, filed on May 20, 2019, provisional application No. 62/850,132, filed on May 20, 2019.

(51) Int. Cl.
 *H02J 3/14* (2006.01)
 *H02J 3/38* (2006.01)

(52) U.S. Cl.
 CPC .............. *H02J 3/14* (2013.01); *H02J 3/383* (2013.01); *H02J 2203/20* (2020.01); *H02J 2310/64* (2020.01)

(58) Field of Classification Search
 CPC .......... H02J 3/14; H02J 3/383; H02J 2310/64; H02J 2203/20
 See application file for complete search history.

(56) References Cited

U.S. PATENT DOCUMENTS

| | | | | |
|---|---|---|---|---|
| 2010/0100253 | A1* | 4/2010 | Fausak | G01D 4/002 700/295 |
| 2014/0148963 | A1 | 5/2014 | Ozog | |
| 2014/0316973 | A1 | 10/2014 | Steven et al. | |
| 2018/0254632 | A1* | 9/2018 | Elbsat | G06Q 50/06 |
| 2019/0184844 | A1* | 6/2019 | Uyeki | B60L 53/66 |
| 2019/0383637 | A1* | 12/2019 | Teske | G01C 21/3682 |
| 2020/0106294 | A1* | 4/2020 | Wenzel | H02J 3/381 |
| 2020/0142364 | A1* | 5/2020 | Craig | H02J 13/0017 |
| 2020/0389029 | A1* | 12/2020 | Minegishi | H02J 3/381 |

OTHER PUBLICATIONS

PCT International Search Report and Written Opinion for International Application No. PCT/US2020/33734 dated Oct. 20, 2020, 8 pages.

* cited by examiner

*Primary Examiner* — Thomas C Lee
*Assistant Examiner* — Charles Cai
(74) *Attorney, Agent, or Firm* — Suiter Swantz pc llo

(57) ABSTRACT

A power transmission and modulation control system may perform one or more operations including, but not limited to: receiving provider net energy availability data indicative of energy available from a power provider over a time interval; receiving end-user energy demand data indicating: an amount of energy to be provided to at least one powered device, and an end-time by which the amount of energy is to be provided to the at least one powered device; determining one or more time intervals over which the amount of energy to be provided to the at least one powered device can be allocated; and controlling a power regulator to provide the amount of energy to the at least one powered device over the selected time interval.

17 Claims, 20 Drawing Sheets

SYSTEMS AND METHODS FOR OPTIMIZING ENERGY DEMAND WITH ENERGY AVAILABILITY SHAPES, THROUGH INPUTS, INCENTIVIZATION AND DISPLAY

PRIORITY

The present application claims the benefit under 35 U.S.C. § 119(e) of U.S. Provisional Patent Application Ser. No. 62/850,124, filed May 20, 2019, titled GAS PRICE EQUIVALENT CONVERSION DISPLAY, naming Harish P. Singh as inventor, which is incorporated herein by reference in the entirety.

The present application claims the benefit under 35 U.S.C. § 119(e) of U.S. Provisional Patent Application Ser. No. 62/850,132, filed May 20, 2019, titled FLEET CHARGING FOR SOLAR LEVEL 3 STATIONS, naming Harish P. Singh as inventor, which is incorporated herein by reference in the entirety.

BRIEF DESCRIPTION OF THE DRAWINGS

Various embodiments or examples of the present disclosure will become more fully apparent from the following description taken in conjunction with the accompanying drawings ("Figures"). It is to be understood that the Figures depict only several embodiments in accordance with the disclosure, and therefore, are not to be considered limiting in its scope. The use of the same reference numbers in different instances in the description and the Figures may indicate similar or identical items. In general, operations of disclosed processes may be performed in an arbitrary order, unless otherwise provided in the claims. The Figures are not necessarily to scale.

DETAILED DESCRIPTION

Figure 1:
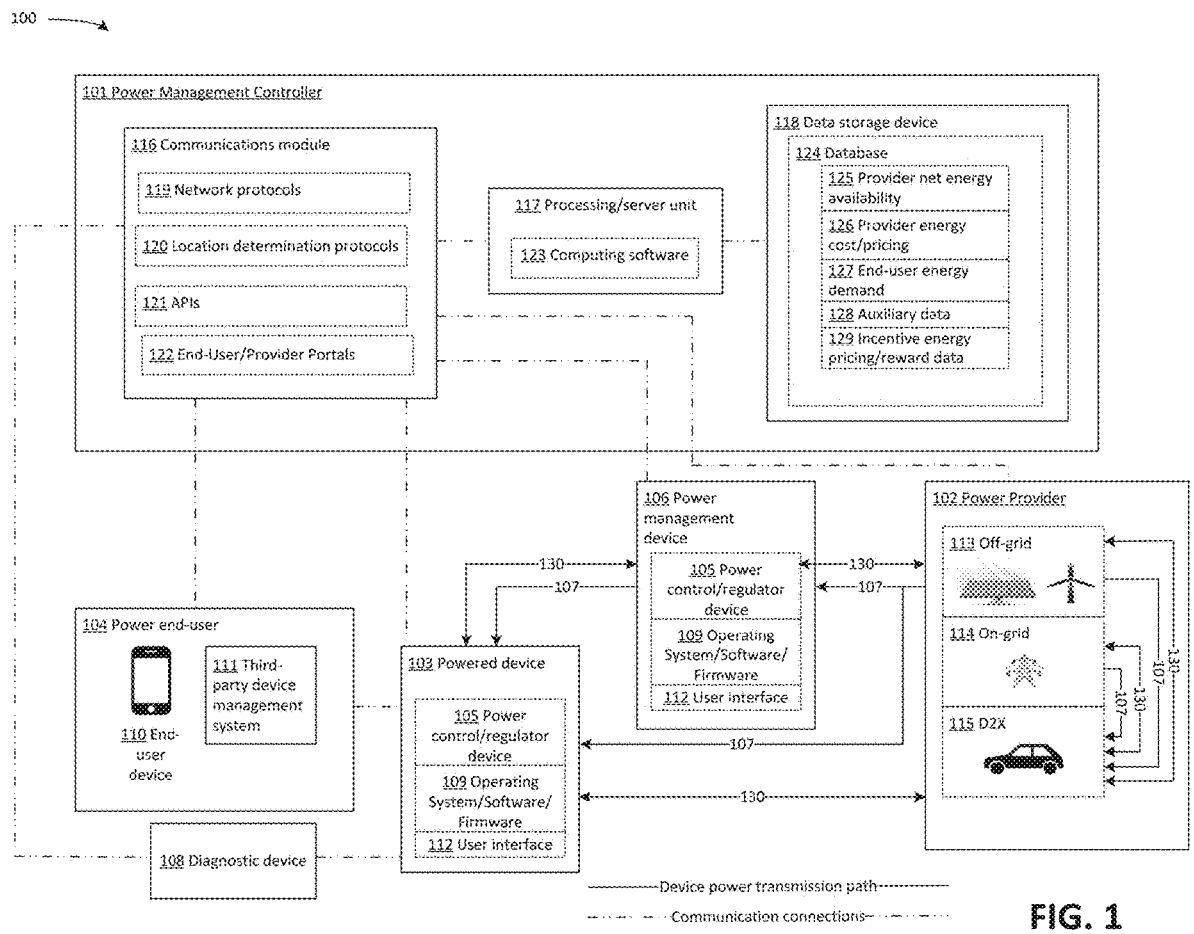
FIG. 1 shows a device power control system.

The present disclosure relates to the field of energy and power management, and more particularly to systems and methods for the electrical powering of devices, including through behavioral incentives and gaming, so as to optimize energy demand with energy availability.

Several trends are converging together in the field of energy and power management: proliferation of new electric power demanding devices; growth of, and efficiency gains in, renewable energy sources and in energy storage systems; and digitization of communications and data. These developments pose both opportunities (e.g., for end-users, cleaner and lower cost energy; for power providers, new customers and increased revenue) and challenges (e.g., for end-users, lack of understanding about true costs of operating devices; for power providers, difficulty managing demand within capacity). A system and method is needed for optimizing energy demand with energy availability by harmonizing the goals of both end-users and power providers—whether awareness and knowledge, economics, environmental, social or infrastructural—thereby transforming the field of energy and power management from centralized/unidirectional, static, reactive and therefore vulnerable to capacity stressors; to distributed/bidirectional, dynamic, proactive and therefore resilient through demand and supply load-balancing.

The present disclosures are directed to systems and methods for the electrical charging and/or powering of devices, including through behavioral incentivization, so as to provide end-user with a system for monitoring and control of electrical device powering that meets their power needs and preferences while providing demand load-shaping towards optimization of power provider objectives. The present disclosures provide for a system and method of behavior incentivization that mitigates inefficiencies in energy and power management and the resulting imbalances in demand vs. energy availability and/or power supply. Data inputs from power provider, end-user, and auxiliary data sets are utilized to compute both the demand for and availability of energy (e.g., in kWh); to correlate, across a defined time interval, such energy demand inputs to energy availability continuums (i.e., power-time continuum(s)); to identify a portion of one or more such correlated energy availability continuum(s), as optimal with power provider objectives; and to generate incentives for maximizing selection of such identified power-time continuum(s). Such incentives and corresponding power-time continuum option(s) may be communicated and displayed for selection by an end-user; such selections may be executed, recorded and reported.

A system for electrical device powering through direct or indirect charging (the latter including wired or wireless induction, magnetic resonance, and the like) may be configured for extracting and processing information on the availability of and demand for energy (e.g., in kWh); for computing energy availability shape(s), i.e., power-time continuum(s); for computing a range of potential energy demand shapes, i.e., power-time continuums, and fitting the same with the energy availability shape; for identifying one or more such energy demand shape(s) as optimal in meeting power provider objectives; for computing incentives for such identified energy demand shape so as to maximize selection of corresponding power-time continuum by end-user; for executing such selection; and for recording, reporting and continual analyzing and utilizing of the selection.

Referring to FIG. 1, a device power control system 100 for providing such benefits is shown. The device power control system 100 may include one or more of: a power management controller 101, a power provider 102, a powered device 103, a power end-user 104, a power controller/regulator 105, and/or a power management device 106. The power management controller 101 may command the power controller/regulator 105 (e.g. a switch, a current or voltage controller, and the like) for controlling the scheduling, delivery, and characteristics of providing electrical provider power 107 to the powered device 103 directly or via the power management device 106 (e.g. a thermostat). The power controller/regulator 105 may reside in the powered device 103 itself (e.g. an air conditioner) or in the power management device 106 (e.g. an L2 EV charging station operating on AC current in the 240v range with variable amperage, or L3 charging station operating on DC current in the 480v and higher range with variable amperage as well as rectifier) and may possess control circuitry (e.g., sensors, computational logic/programming) configured to enable, disable, modulate up/down and/or modify characteristics of electrical provider power 107 in response either to sensors or to commands from power management controller 101.

The power management controller 101 of device power control system 100 may include: a communication module 116 for receiving and sending data and commands; processing/server units 117 (e.g. local or distributed processors) for computing and analyzing data and for determining commands; and a data storage device 118 (e.g. one or more data storage servers) for data management.

The communication module 116 of power management controller 101 may receive and send data and commands through any or all network protocols 119, location determination protocols 120, application programming interfaces (APIs 121) and end-user/provider portals 122; all of which may in turn connect with any or all of the power provider 102, powered device 103, power end-user 104, power controller/regulator 105, power management device 106, a diagnostic device 108, and sources of auxiliary data 128. The network protocols 119 may include wired and/or wireless communications including cellular, Wi-Fi, LoRa, Bluetooth, ZigBee, Z-Wave, MANET (mobile ad-hoc networks), VANET (vehicular ad-hoc networks), metropolitan area network (MAN), wide area network (WAN), broadband/global area network (B/GAN), satellite and the like. Location determination protocols 120 may include positioning and navigation systems, such as GPS and/or regional equivalents (Galileo, Beidou, GLONASS, etc.) and/or technical variants (e.g., assisted GPS, synthetic GPS), cellular identification, Wi-Fi identification, sensors (inertial, barometric, ultrasonic, etc.), Bluetooth beacons, terrestrial transmitters, radar, lidar, and the like; location may also be obtained from manual inputs on end-user/provider portals 122. The APIs 121 may include application programming interfaces integrating functionalities with other parties. The end-user/provider portals 122, for power provider 102 and power end-user 104, may include interface features and functions on display/touch screen based platforms (e.g., website, mobile applications, LCD screens, and the like); through audio-enabled platforms (e.g., Amazon Echo, Google Home, and the like); and/or through telecom platforms (e.g., support services); and the like.

The processing/server units 117 of power management controller 101 may compute and analyze data and determine commands through computing software 123 including computational algorithms and artificial intelligence (AI) algorithms such as machine learning, artificial neural networks (ANN), convolutional neural networks (CNN), natural language processing (NLP), recurrent neural networks (RNN) and the like.

The data storage device 118 of power management controller 101 may, through database 124, enable data management functionalities for the defining, creating, importing, receiving, retrieving, administering, maintaining, storing, controlling, transmitting, exporting and the like, of data sets including data indicative of provider net energy availability 125, provider energy pricing 126, end-user energy demand 127, auxiliary data 128, and incentive energy pricing/rewards 129. The data storage device 118 and database 124 may include any number of database software management systems whether relational, object-relational, nonrelational or other; may be physical and/or cloud-based; may be centralized and/or distributed and/or federated; and may include tokenization for the enabling of distributed ledger technology (aka "blockchain") functionality.

The device power control system 100 may further include a power provider 102 capable of delivering/sending/transmitting electrical provider power 107. Such power provider 102 may be an off-grid provider 113 (e.g., solar arrays, wind turbines; moveable batteries, smart appliances within an autonomous/stand-alone micro-grid; and the like); an on-grid provider 114 (e.g., power plants generating energy from sources including coal, natural gas, nuclear, geothermal, hydro, solar, wind, biomass, and the like; ISO's/RTO's—independent system operators, regional transmission operators; local utilities including at substation and transformer levels; and microgrids); and/or a device-to-device (D2D), device-to-home (D2H) and/or device-to-grid (D2G) electrical power (collectively D2X system 115) (e.g., powered device 103 with capabilities of all of the following: energy storage (battery, hydrogen storage systems, etc.), power generation (fuel cells, internal combustion engines, etc.), power regulation, and transmission (inverters, wireless electricity, etc.)).

The power provider 102 may be associated with a geolocation through location determination protocols 120 and may provide inputs for the computation, via computing software 123 in processing/server units 117, of provider net energy availability 125 and of provider energy pricing 126. Such provider net energy availability 125, i.e., total power capacity available (e.g., in kW) less total power being used by powered device 103, the sum per time interval h may be real-time, historical, forecasted, dynamically adjusting, or partial (e.g., only size/capacity of a solar array of a power provider 102 is known, requiring auxiliary data 128, such as solar forecast, cloud cover, etc.). In FIG. 2, the provider net energy availability 125 is bounded by the top line of power levels available across a time interval, and the bottom line of power levels being used across the same time interval. The provider energy pricing 126, expressed in a unit of currency per energy measurement unit (e.g., $ per kWh), is the difference between the rates at which power provider 102 sells electrical provider power 107 (including published rates, time of use rates, dynamic pricing rates, contracted rates, and the like), and the rates at which power provider 102 purchases power. The inputs used to compute provider net energy availability 125 and provider energy pricing 126 may be obtained from power provider 102 (via APIs 121 or end-user/provider portals 122); from auxiliary data 128 (e.g., public data sets on forecasts affecting energy availability, on published cost and selling rates of energy); from power end-user 104 (by manual input on end-user/provider portals 122 during an initial registration or update of a profile); and the like.

The device power control system 100 may include powered device 103 and power end-user 104. A powered device 103 requiring electrical provider power 107 may be single or aggregate (e.g., fleets), and may include electric vehicles (EV), plug-in hybrid electric vehicles (PHEV), unmanned aerial systems (UAS), HVAC systems, appliances, residential or commercial power storage units, agricultural and farm pumps, mobile communications devices, or any other device requiring electrical powering. A power end-user 104 that utilizes powered device 103, may be an individual or an automated system (e.g., EV/PHEV fleet management system).

The powered device 103 and power end-user 104 may be associated with a geolocation through location determination protocols 120 and may provide inputs for the computation, by computing software 123 in processing/server units 117, of end-user energy demand 127 and time interval h within which it is required. Such end-user energy demand 127 inputs may include the clock time by which energy is required (e.g., the EVReady Time™ for EVs/PHEVs); the actual amount of energy required (e.g., kWh required for full battery state of charge), or other units from which the amount of energy required may be approximated (e.g., cooling/heating to a certain temperature, charging to a certain number of miles/km for an EV, and the like) by computing software 123 from data retrieved from database 124 (e.g., pre-populated look-up table with power capabilities, such as kW, of powered device 103, according to its make and model as inputted by power end-user 104 during an initial registration or update of a profile). All such inputs for end-user energy demand 127 may be communicated, via communication module 116, by powered device 103 directly through any internal OS/software/firmware 109, and/or indirectly through diagnostic device 108 (e.g., an on-board device (OBD)) connected to powered device 103; and also communicated by power end-user 104 through end-user/provider portals 122 on end-user device 110 (e.g., mobile, desk/laptops, audio or telecom platforms, and the like) and/or on third-party device management system 111 (e.g., fleet management software, thermostat/smart home software, and the like).

The device power control system 100 in FIG. 1 may include real time or auxiliary data 128 (e.g., forecasted and/or historical data) that may be utilized in computations of provider net energy availability 125, provider energy pricing 126 and/or end-user energy demand 127 as described above. Such auxiliary data 128 may be obtained internally from within the device power control system 100 (e.g., inputs by power end-user 104 during an initial registration or update of a profile associated with the powered device 103, such as make and model of the powered device 103, rate(s) paid for electrical provider power 107, preferences for particular sources of energy, personal values/goals such as minimizing carbon; as well as historical behavior of power end-user 104 regarding powering of powered device 103; and the like) and/or obtained externally, via communication module 116, from proprietary and public data sources on weather (e.g., precipitation, cloud cover, solar angle, wind speed, and the like); environment (e.g., air and light pollutions, natural disasters or accidents, and the like); pricing of other energy sources (e.g., gaseous fuels); changes in published rates at which power is purchased and sold; newsworthy developments and any other information that may augment computations of provider net energy availability 125, provider energy pricing 126 and/or end-user energy demand 127.

Figure 2A:
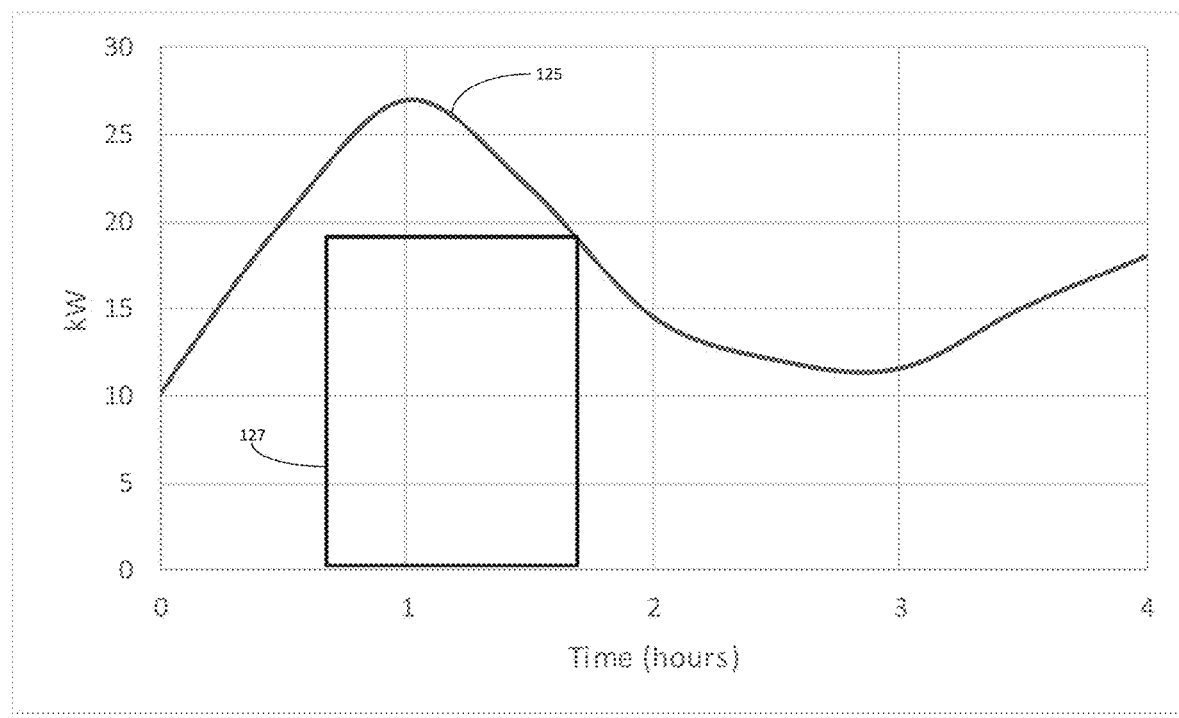
FIGS. 2A-2M show various correlations of energy availability to energy demand.
Figure 2B:
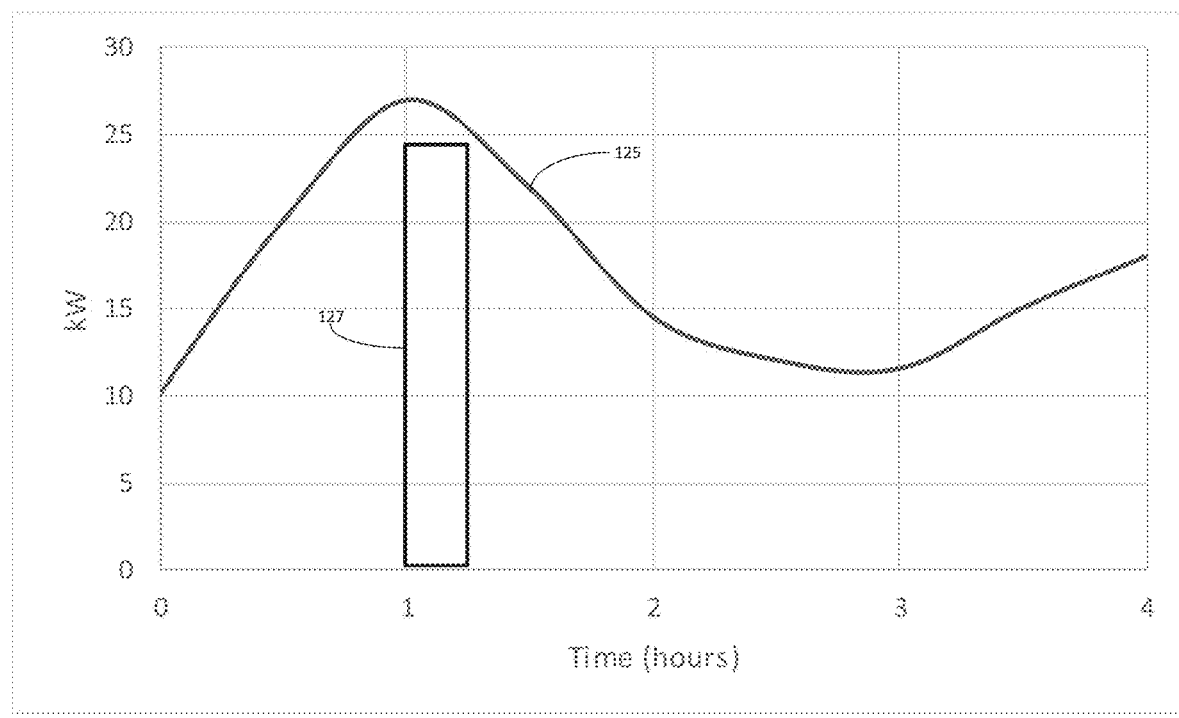
Figure 2C:
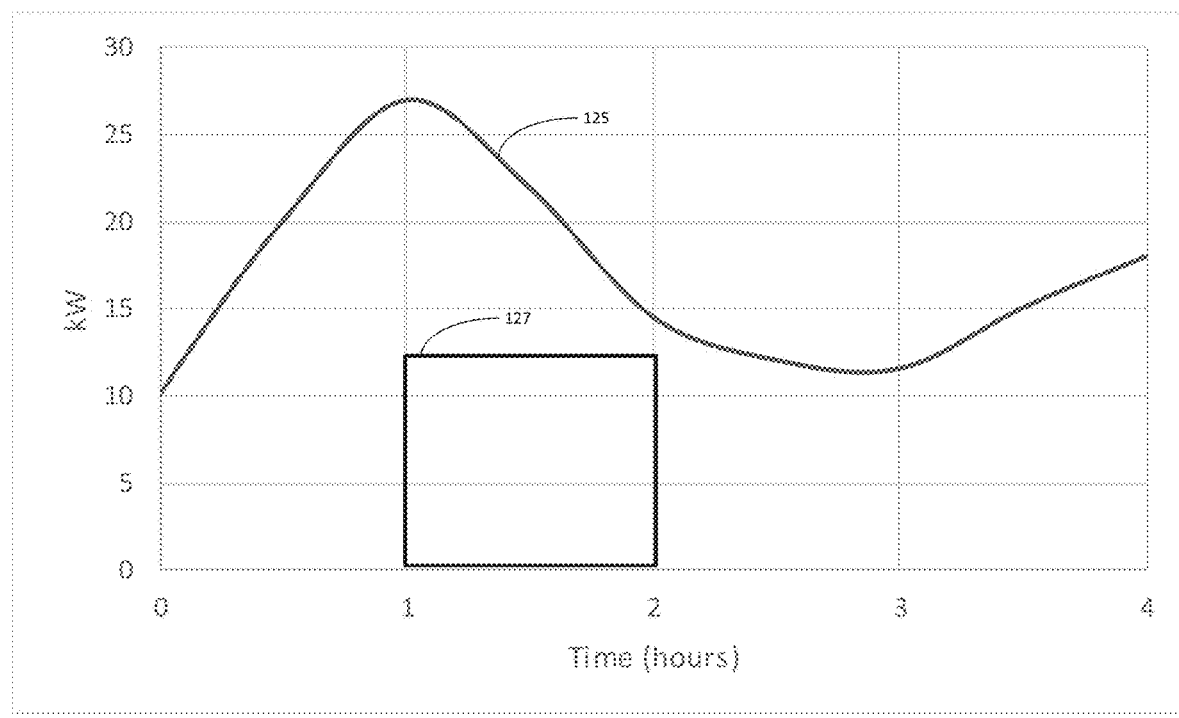
Figure 2D:
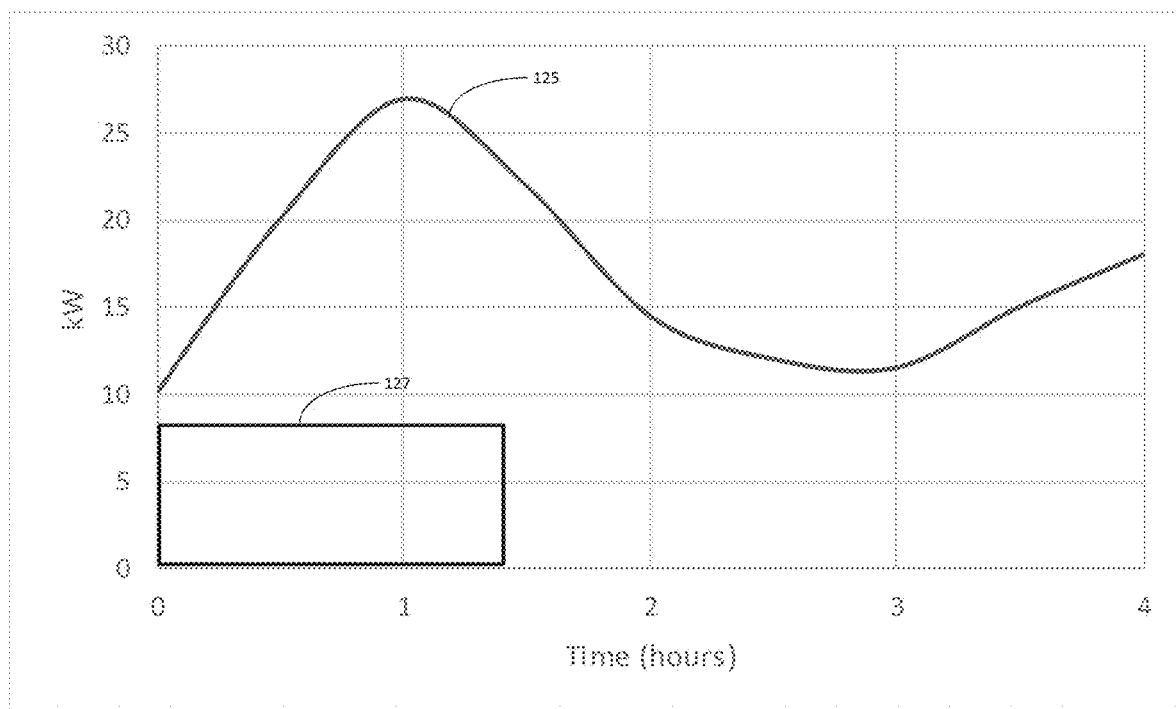
Figure 2E:
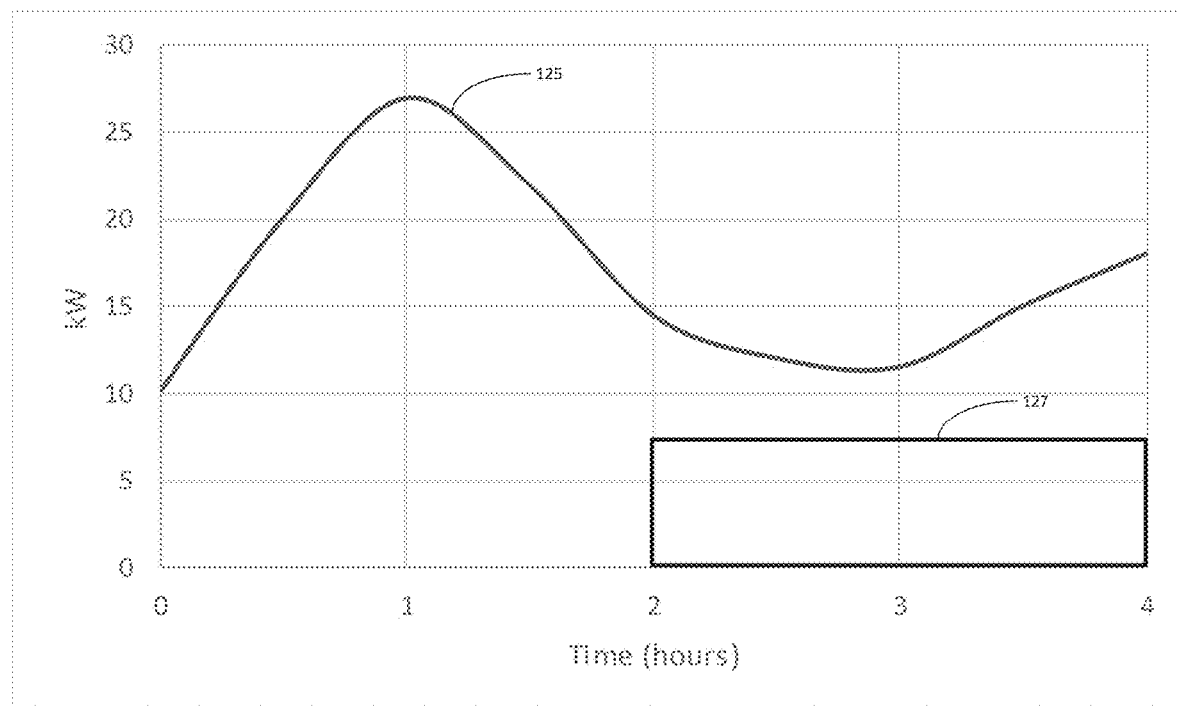
Figure 2F:
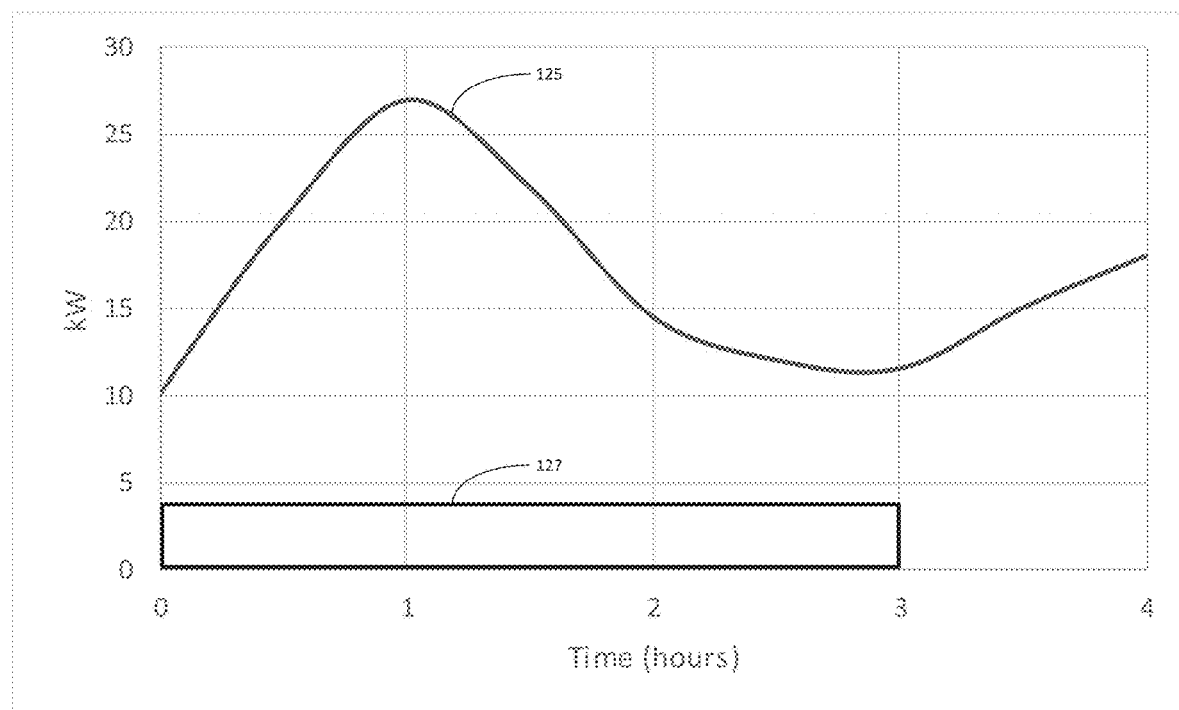
Figure 2G:
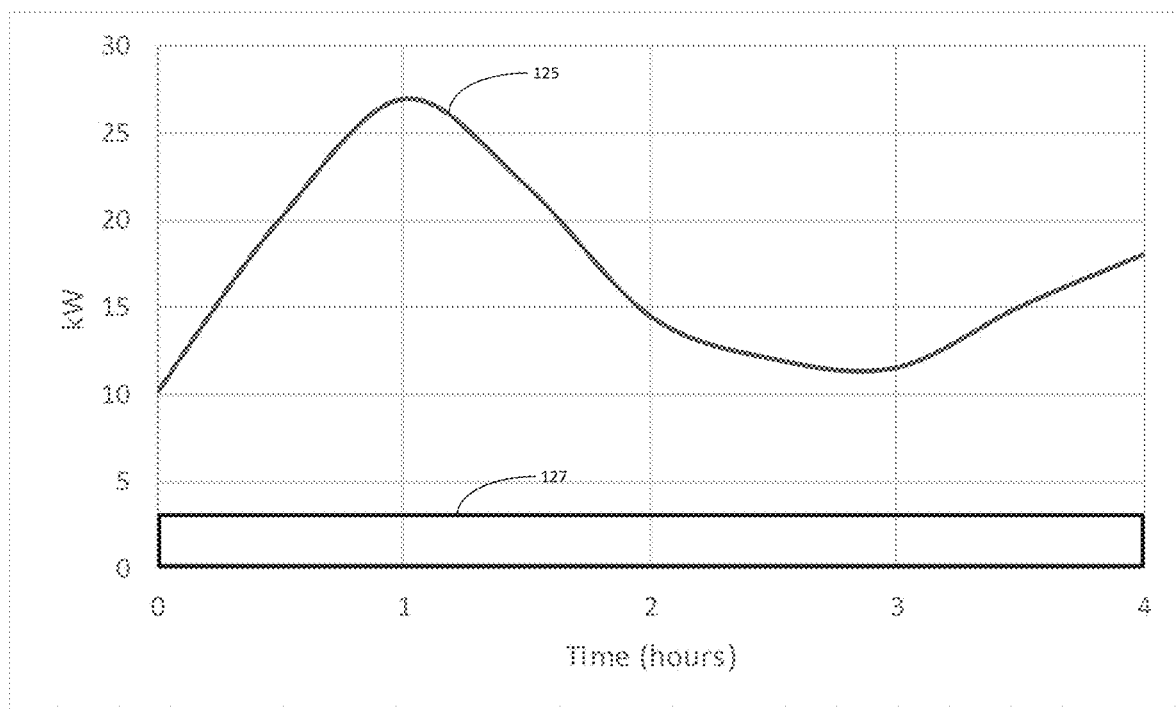
Figure 2H:
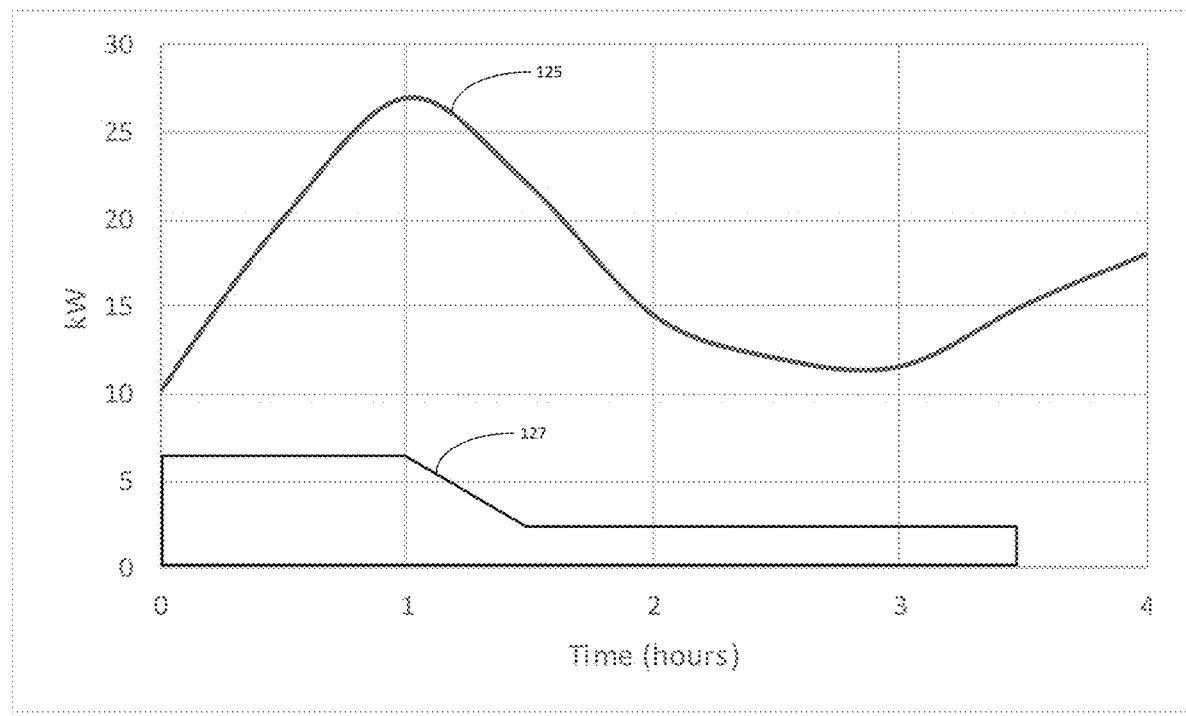
Figure 2I:
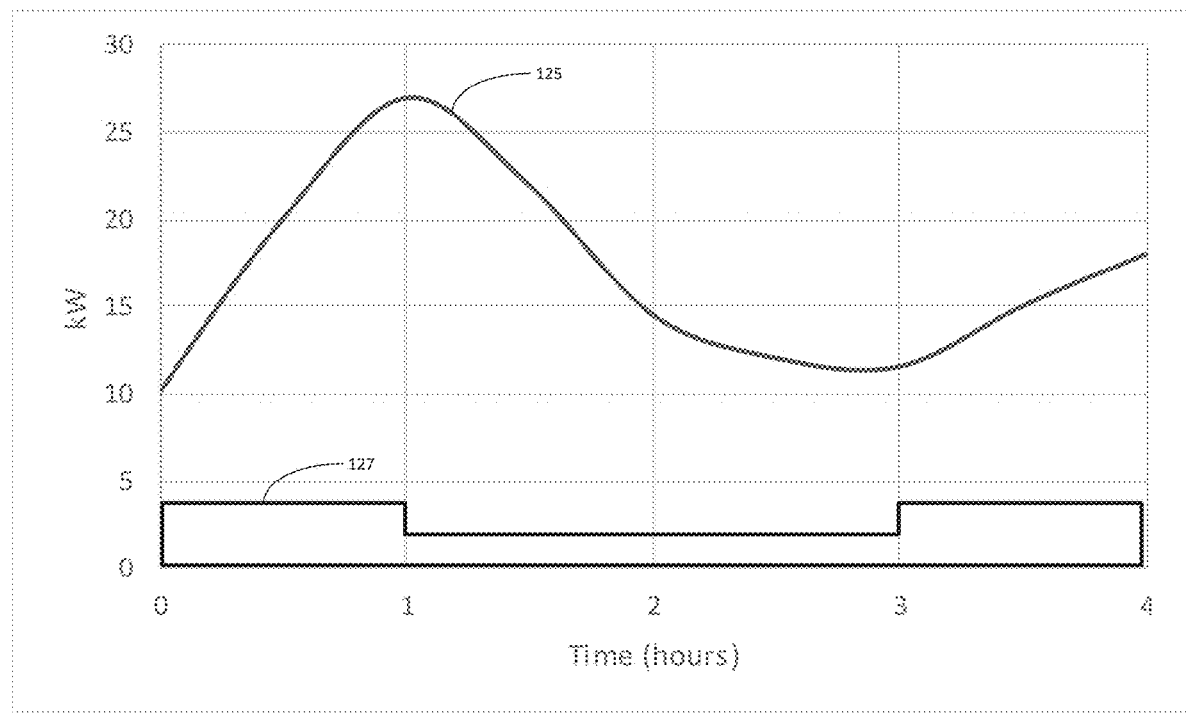
Figure 2J:
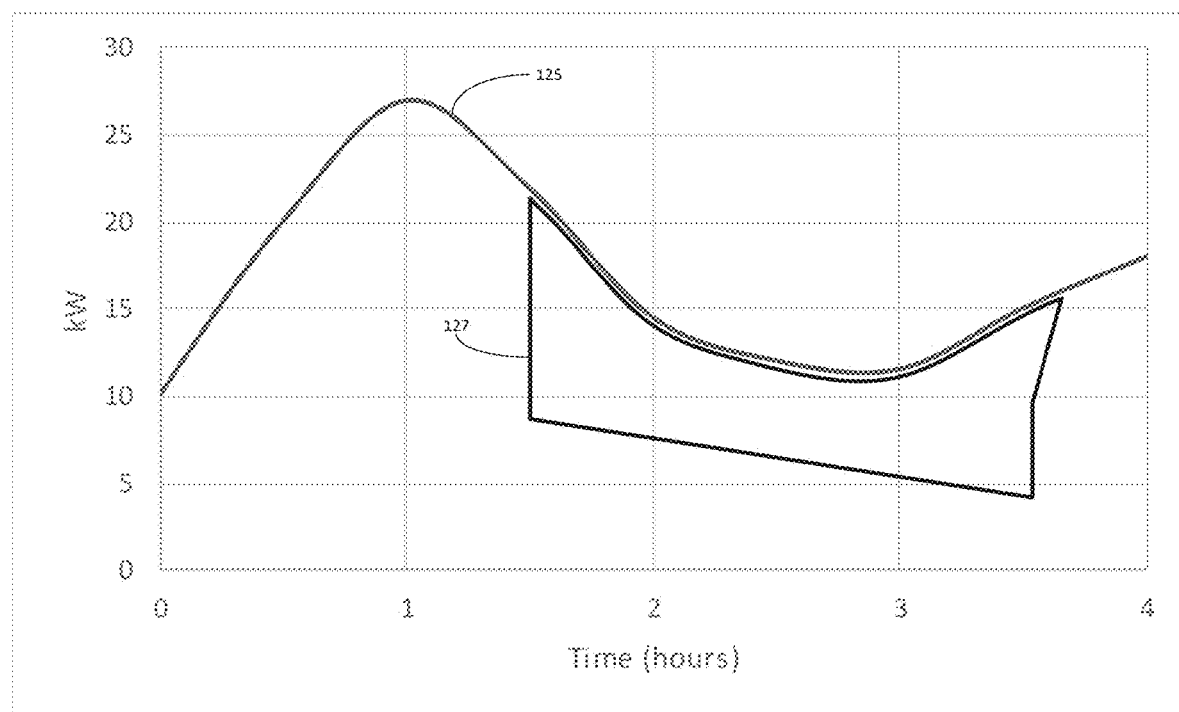
Figure 2K:
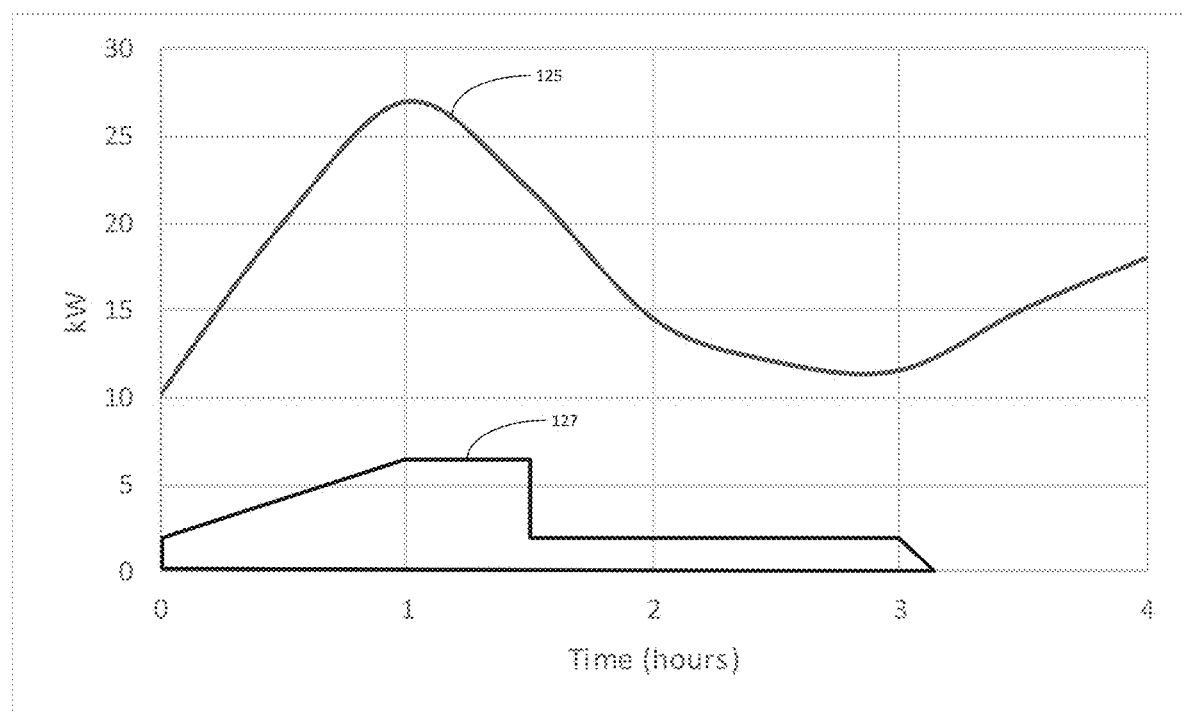

The computing software 123 in processing/server units 117 of the power management controller 101, may map the geolocations of powered device 103 with power provider 102 to determine the applicable provider net energy availability 125 and provider energy pricing 126; may match the time interval indicated by end-user energy demand 127 with the corresponding time interval subset in provider net energy availability 125; may plot provider net energy availability 125 in terms of power level (e.g., kW) on a y axis and time interval h on an x axis; may similarly plot end-user energy demand 127 as any or all possible area shapes, i.e., power-time continuums, that can be fitted with the resultant area shape of provider net energy availability 125. In FIGS. 2A-2M, multiple potential shapes of end-user energy demand 127 (e.g., 12 kWh) over a time interval (e.g. four hours). Such shapes may include:

Continuous:
  FIG. 2A: 18 kW for 0.75 hours—power end-user indicates preference for maximum solar power;
  FIG. 2B: 24 kW for 0.5 hours—a power end-user indicates preference for maximum solar power;
  FIG. 2C: 12 kW for 1.0 hour—maximum charging power of powered device capped at 12 kW, rendering it unable to charge any faster during peak of solar energy;
  FIG. 2D: 8 kW for 1.5 hours; "packing" scheduled energy demand into earliest possible time slots/greatest amount of net energy availability, to enable greater flexibility against variability at a later time (e.g., rescheduled/random energy-demands; weather-related drop in energy availability; etc.);
  FIG. 2E: 6 kW for 2 hours—power end-user known (through historical behavior analysis from Auxiliary data) to never require energy demanded earlier than stated time interval of 4 hours.
  FIG. 2F: 4 kW for 3 hours—power end-user known (through historical behavior analysis from Auxiliary data) to often require energy demanded earlier than stated time interval of 4 hours
  FIG. 2G: 3 kW for 4 hours—energy demand met literally across the entire time interval demanded; or maximum charging power of powered device capped low power levels;

Intermittent
  FIG. 2H: For power end-user indicating preference for maximum solar power, the power level to meet energy demand reduces along with solar power availability;
  FIG. 2I: Power level halved for powered device, possibly due to another powered device arriving and demanding (i.e., out-bidding on price) for maximum solar power; once new powered device has finished charging or left, previous power level resumes;
  FIG. 2J: Power end-user indicated preference for renewables, both wind & solar (Auxiliary data of historical behavior may also indicate willingness to pay more to achieve preference). On this particular day, given power usage by other powered devices, this preference can be achieved only by varying the power levels and time, resulting in an unusual non-symmetric shape.
  FIG. 2K: The powered device must accommodate unusual power usage by other powered devices, resulting in variable and unusual energy demand shape.

Figure 2L:
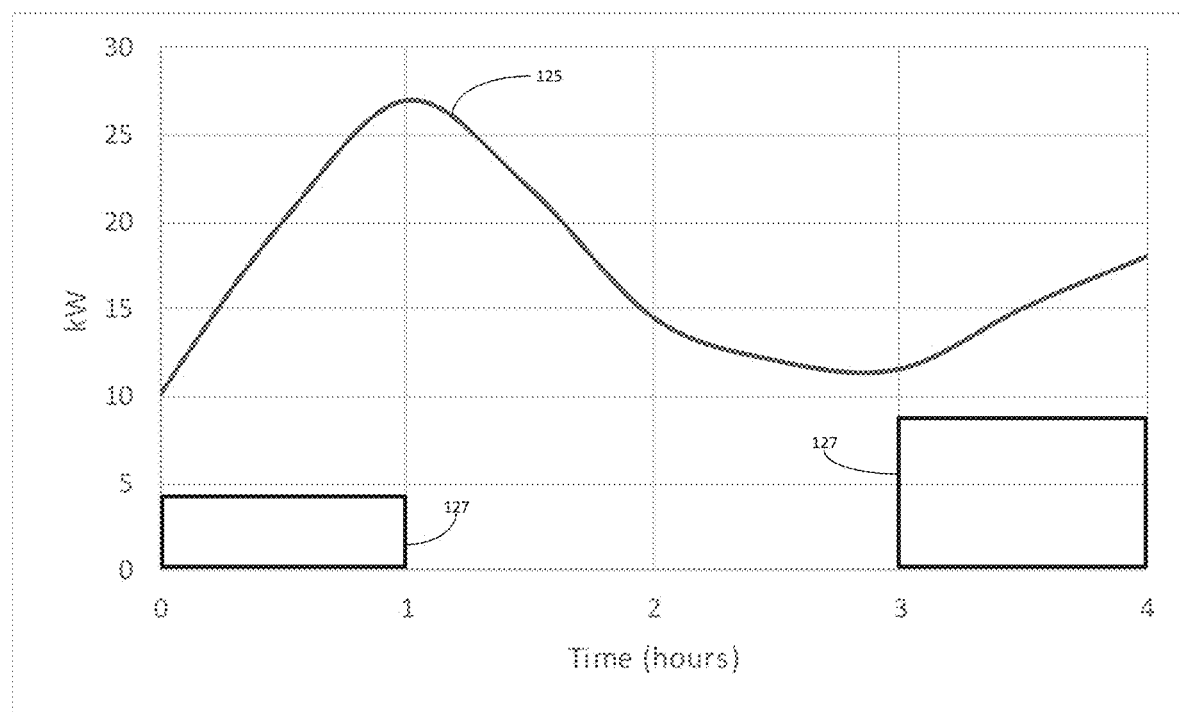
Figure 2M:
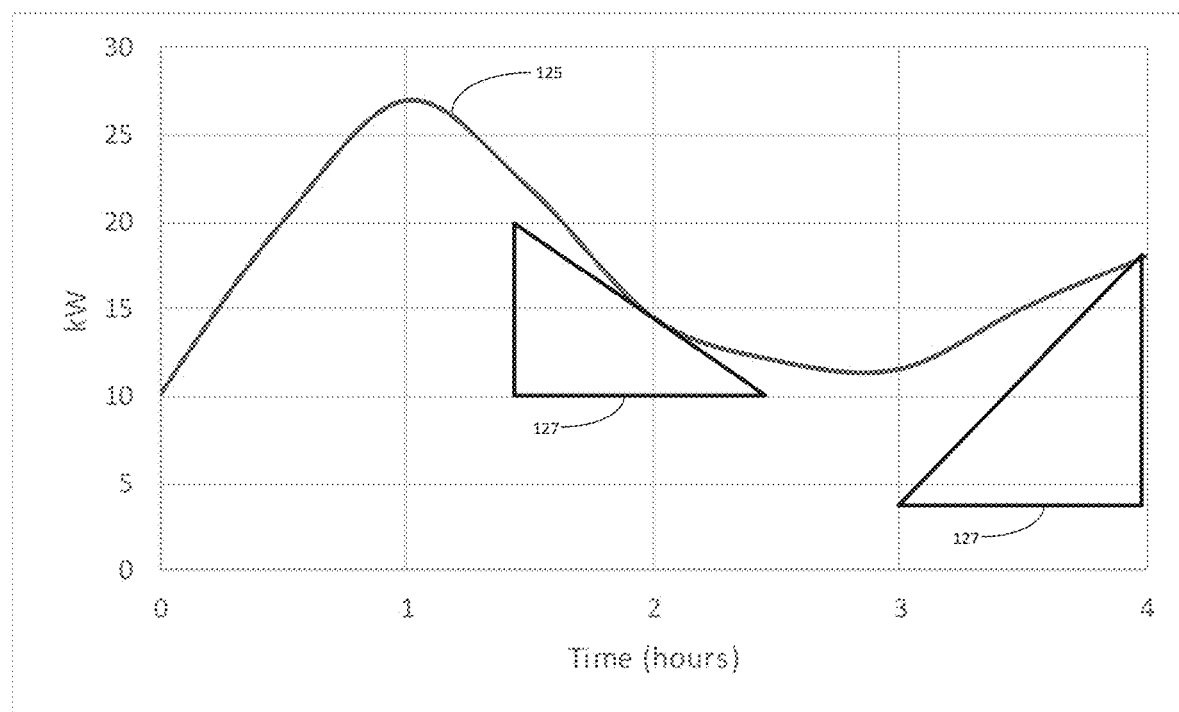

Interrupted
  FIG. 2L: Powered device has its power interrupted, due to technical issues or another power-demanding device unexpectedly arriving and placing demands on power, perhaps in particular solar power; charging resumes at hour 3 at a higher power level upticking along with a rise in energy availability (e.g., wind) to ensure completion by hour 4.
  FIG. 2M: Power end-user indicated preference for renewables, both wind & solar (Auxiliary data of historical behavior may also indicate willingness to pay more to achieve preference). Left triangle reduces power along with solar availability; charging is interrupted and then right triangle resumes, rapidly increasing power to coincide with wind.

Such shapes may encompass positive or negative sloped or curved portions, are plotted against the shape of provider net energy availability 125, or with a filtered subset of such data such as energy available from a specific energy source-type (e.g. fossil fuel, renewable, etc.), at the corresponding time interval.

The computing software 123 in processing/server units 117 of the power management controller 101, may identify, from the multiple potential shapes of the end-user energy demand 127 in FIG. 2, one or more shapes representing optimal power time continuum(s) for powered device 103 to obtain electrical provider power 107 at a certain geolocation, at a certain time, for a certain time interval h, and at certain power level(s), as optimal for the objectives of power provider 102. Such objectives may include improving capacity efficiency (e.g., demand-load smoothing through gap elimination between energy demand and supply shapes); stabilizing infrastructure (e.g., demand-load randomness reduction through frequency regulation); increasing economic performance; meeting energy balancing and/or sustainability goals by promoting use of power generated by specific energy source(s) such as renewables; and the like. Thus, at a micro level, i.e., within and relative to time interval h specified by end-user energy demand 127, the computed shape-fittings of one or more end-user energy demand 127 shapes may be identified as optimal (within the bounds of the given four hours in FIGS. 2A-2M) for the objectives of power provider 102.

Figure 3:
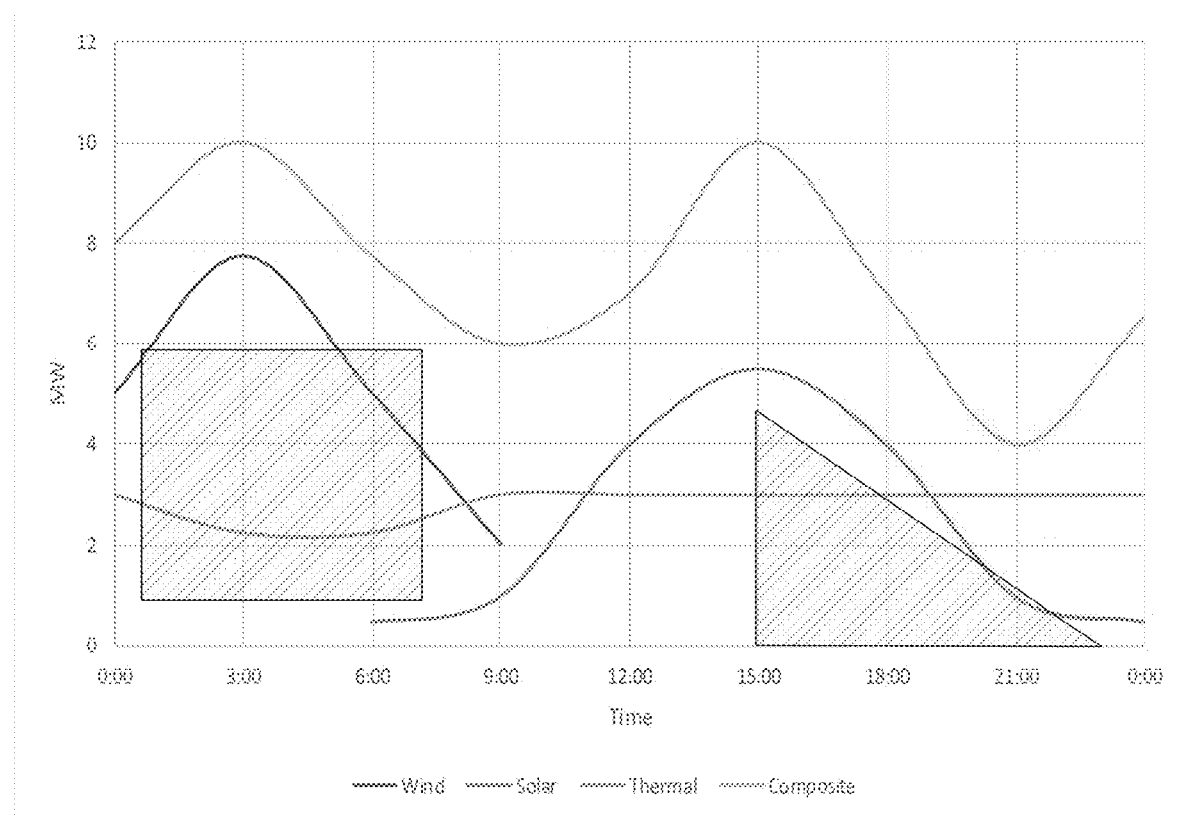
FIG. 3 shows various correlations of availability of various energy sources to energy demand.

At a macro level such as a 24-hour period (FIG. 3) or other extended time periods (i.e., any period well beyond time interval h specified by end-user energy demand 127), the optimality to power provider 102 of identified end-user energy demand 127 shape(s) may range from (a) detrimental: power end-user 104 values time above all other considerations when charging (e.g., a EV/PHEV) suddenly, urgently and at peak hours, thereby straining provider net energy availability 125); (b) neutral: power end-user 104 has no preferences other than EV/PHEV readiness over a long horizon (e.g., 12+ hours later the next morning), allowing wide latitude in shape-fitting end-user energy demand 127 as an optimally positioned power-time continuum with provider net energy availability 125 shape; (c) beneficial: power end-user 104 prefers solar energy, thereby sparing and also potentially, through providing electrical D2X power 130, increasing provider net energy availability 125 during peak hours.

The spectrum of such macro-level effects to power provider 102 by the end-user energy demand 127 shapes, may be harmonized both within time interval h specified by end-user energy demand 127 and with any broader time interval considered by power provider 102, by device power control system 100 through a corresponding spectrum of computed measures: disincentives (e.g., higher selling price of electrical provider power 107, i.e., "Demand Charges"; loss of rewards; and the like); neutral (selling price of electrical provider power 107 may be slightly lower due to time shifting EV/PHEV charging to off-peak hours); positive rewards (e.g., lower selling pricing of electrical provider power 107; higher rewards, and the like). Such measures may seek to dis/incentivize end-user energy demand 127, i.e., power-time continuums, in terms of proposing either or both a different numerical value of time interval h and/or a different positioning of time interval h, i.e., clock time on the x axis).

Incentive/disincentive measures, i.e., incentive energy pricing/rewards 129, may be determined by computing software 123 in processing/server units 117 of the power management controller 101, and may be defaulted to lowest cost and/or highest reward possible for the optimal power-time continuum(s), i.e., for powered device 103 to obtain electrical provider power 107 at a certain geolocation, at a certain time/interval h, and at certain power level(s), as optimal for the objectives of power provider 102. The computation of such incentive energy pricing/rewards 129 may utilize various data from database 124 including but not limited to provider energy pricing 126 (i.e., the difference between provider energy selling rate and provider energy purchase price), from which spread the price of electrical provider power 107 may be subsidized; availability of rewards and schemes from power provider 102, third-party partners, and the like (e.g., membership points, etc.); auxiliary data 128 (e.g., historical and/or predictive data on seasonal trends that may affect pricing; historical behaviors of power end-user 104); and the like.

The incentive energy pricing/rewards 129 for optimal power-time continuum(s), may be expressed in numerous ways to power end-user 104. For example, incentive energy pricing/rewards 129 may be conveyed as a unit of currency per energy measurement unit (e.g., $ per kWh).

The incentive energy pricing/rewards 129 may also be expressed in novel information forms to help power end-user 104 understand the cost of obtaining electrical power (i.e., a relatively abstract measurement), in terms of any number of measurements and/or metrics that are more tangible or familiar or even more important to a power end-user 104. For example, an incentive cost of and/or reward for an EV/PHEV to charge may be conveyed in terms of e-Gallons™ or e-Liters™ (i.e., the cost of electrical provider power 107 required to obtain a battery charge level capable providing the same number of miles as a similar make and model internal combustion engine (ICE) vehicle would obtain from a gallon or liter of conventional fuel such as gasoline or diesel), such that a power end-user 104 may better understand the value or expense of charging the EV/PHEV vehicle relative to fueling the ICE vehicle as, in certain geographic areas during peak times, electrically charging an EV/PHEV may cost more than fueling. In another example, or the cost of heating/cooling may be conveyed in terms of e-Degrees F. or e-Degrees C. (i.e., the cost of electrical provider power 107 to change temperature by one degree); or the cost of adhering to or deviating from a preference or value inputted by power end-user 104 during an initial registration or update of a profile (e.g., e-Carbon: the amount of carbon minimized/increased according to a power-time continuum and corresponding incentive energy pricing/rewards 129); and the like. Such novel information forms may be derived by computing software 123 utilizing data in database 124 including provider energy pricing 126; auxiliary data 128 (e.g., price of a gallon or liter of fuel prevailing in the relevant geolocation; make and model of powered device 103 as inputted by power end-user 104 during an initial registration or update of a profile); and the like.

The incentive energy pricing/rewards 129 may also be expressed in terms of game playing for power end-user 104. Various elements of such gaming may include self-defined benchmarks (e.g., a personal goal of minimizing carbon may have inputted during an initial registration or update of a profile); system-generated challenges (i.e., generated by device power control system 100); competition against others (e.g., in self-defined or in general groups); community/social cooperation (e.g., responsiveness to local and/or neighborhood power conditions); and the like. Such gaming measures may be incentivized with rewards (monetary/quasi-monetary/non-monetary), points, badges, levels, honors, recognition, progress bar, notifications, message boards, and the like.

The incentive energy pricing/rewards 129 may be communicated and displayed visually (text and/or graphic) and/or audibly, via communication module 116, on end-user/provider portals 122 accessed by power end-user 104 through end-user device 110, third-party device management system 111, and/or device user-interface 112. For example, incentive energy pricing/rewards 129 may be graphically displayed as the geometry of corresponding end-user energy demand data shape(s)s and its/their positioning (i.e., placement within the within the y and x axes) relative to provider net energy availability 125 shapes.

Display of incentive energy pricing/rewards 129 and corresponding shapes of optimal end-user energy demand 127 (i.e., power time continuum(s) for powered device 103 to obtain electrical provider power 107 at a certain geolocation, at a certain time, for a certain time interval h, and at certain power level(s), as optimal for the objectives of power provider 102), may include corresponding power level options (e.g., 15-amp, 30 amp, and 40-amp charge intensities). Such power level options may be offered and displayed for any duration of time interval, ranging from instances where time interval is undefined (e.g., power end-user 104 needs energy in real-time), to instances where defined time interval is long horizon (e.g., throughout a night characterized by excess supply of provider net energy availability 125 (e.g., wind energy) and low end-user energy demand 127). Such power level options (e.g., amperage levels) may be also be displayed in terms of expressions as described above: a unit of currency per energy measurement unit (e.g., $ per kWh); novel information forms (e.g., e-Gallon™, e-Liter™, e-Degree™ F/C; equivalent carbon; and the like); gaming (e.g., points, badges, levels, honors, recognition, progress bar, notifications, message boards, and the like); and the like. Such display of incentive energy pricing/rewards 129 and/or of corresponding power levels, may be available as a discrete number of options (e.g., three choices) and/or in the form of dynamic options (e.g., a sliding scale spectrum of incentive energy pricing/rewards 129 and corresponding power level options).

Display of incentive energy pricing/rewards 129 and/or of corresponding power levels may also be elicited by input from power end-user 104 on end-user/provider portals 122 through end-user device 110, third-party device management system 111, and/or device user-interface 112. For example, power end-user 104 may pose a query in real-time to a personal automated/digital assistant, "How much will it cost to fully charge my EV by z am/pm?"; or "By what time will my home be cooled to 67 F if I pay $0.02 per kWh?"; or "How many carbon credits will I minimize by charging from x1 to x2 time?"; and the like. In another example, power end-user 104 may input onto a screen auxiliary data 128 (e.g., preferred source of energy, personal environmental benchmarks, geostrategic/buy-local considerations, etc.), thereby generating a display of revised computations of incentive energy pricing/rewards 129 and corresponding power(level)-time continuums. In another example, power end-user 104 may tap/touch a sliding scale spectrum interface, thereby triggering a display of revised computations of incentive energy pricing/rewards 129 and corresponding power(level)-time continuums.

The power end-user 104 may select specific incentive energy pricing/rewards 129 and/or corresponding power level, i.e., may select a powering event, on end-user/provider portals 122 through end-user device 110, third-party device management system 111, and/or device user-interface 112. Such powering event selection may be manual or automated. If automated, then from auxiliary data 128, database 124 may retrieve previously executed selections of incentive energy pricing/rewards 129 and/or corresponding power levels, for determining similar present-time selection; or retrieve standing inputs previously provided by power end-user 104 during an initial registration or update of a profile (e.g., preferred energy source type, sustainability values, and the like) that factor into present-time selection; and the like.

Selected incentive energy pricing/rewards 129 and/or corresponding power level, i.e., selected powering event, may be received via communication module 116 into database 124 where it may be recorded and then relayed as a command, via processing/server units 117 and communication module 116, to any of power management device 106 containing power controller/regulator 105 (e.g., EV/PHEV charging station), to powered device 103 (e.g., air conditioner containing power controller/regulator 105) via power management device 106 (e.g., thermostat); or to any powered device 103 that may contain power controller/regulator 105 along with OS/software/firmware 109, for executing the allocation of electrical provider power 107 according to the specified power level(s) at a specified time for a specified time interval h associated with the selected powering event for execution.

The execution of selected powering event may be relayed via communication module 116 to database 124 where it may be recorded. In addition to saving selected and executed incentive energy pricing/rewards 129 and corresponding power levels, database 124 may also record auxiliary data 128 such as any attendant data relevant to selection and execution data including, for example, the browsing behaviors of the power end-user 104 associated with selection of the powering event. Any and all such recorded historical behavioral data sets and patterns and trends in auxiliary data 128 may be analyzed by computing software 123 for refining future shaping and fitting of end-user energy demand 127 with provider net energy availability 125; identification of energy shapes, i.e., power-time continuums optimal for objectives of power provider 102; and, for such identified shapes, the computation, communication and display of incentive energy pricing/rewards 129 and corresponding power levels.

The recording of executed powering event selections may be exported from database 124 via communication module 116 to power end-user 104 and/or to power provider 102, on end-user/provider portals 122. Any auxiliary data 128 attendant to selection and/or execution data sets may also be reported. Such auxiliary data 128 may include energy source (s) used; detailed and average price per energy unit; total and relative currency amount spent and saved (e.g., amount saved by PHEV electric charging relative to conventional fueling); alternate metrics (e.g., carbon reduction achieved); and the like. Such reporting may occur at scheduled intervals and/or on demand, and in any number of formats including email, paper, web, digital including .html, .csv, excel, pdf., and the like.

Figure 4A:
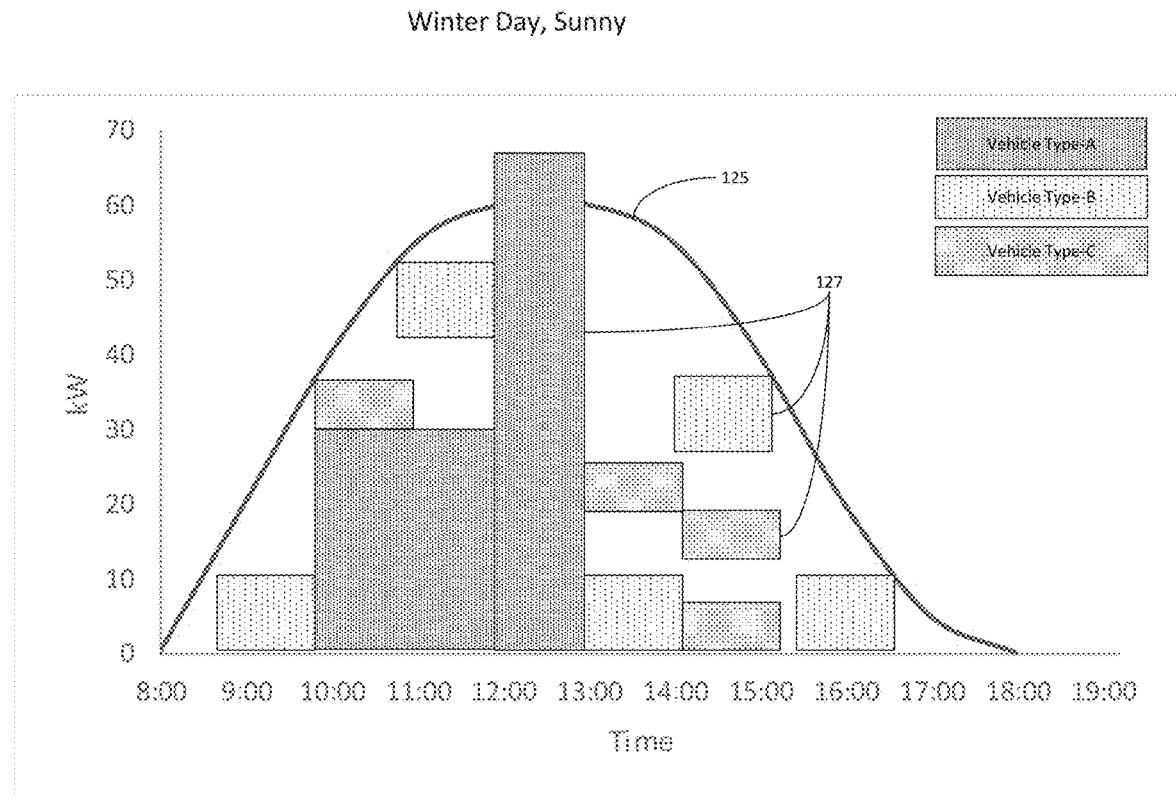
FIGS. 4A-4B show correlations of energy availability to various energy demands.

The device power control system 100 may be implemented with one or more instances of the powered device 103 (e.g. single (e.g., air conditioner) or an aggregate group (e.g., a fleet of EVs/PHEVs)). In FIG. 4A, end-user energy demand 127 of individual vehicles within an aggregate EV/PHEV fleet are shape-fitted within provider net energy availability 125 in the winter season. In instances where powered devices 103 form such an aggregate group, the features of power management controller 101 may become much more dynamic and continual/rolling because the powered devices 103 are not only mobile but also, through the aggregated shape of their end-user energy demand 127, weightier in impact on the shaping-fitting process with the shape of provider net energy availability 125. For example, if a fleet member is for any reason delayed, and therefore deviates from its schedule and itinerary, then computations may have to be updated for (a) provider net energy availability 125, because fleet member may have crossed into a geolocation of a different power provider 102 (which could also apply to a single random EV/PHEV that is not in a fleet); (b) end-user energy demand 127, because the altered (out of schedule) geolocation may represent a correspondingly greater or lesser distance travelled, and therefore respectively a lower or higher battery state of charge (which, again, could also apply to a single random EV/PHEV that is not in a fleet); (c) time interval h required for obtaining power, because the altered (out of schedule) clock time at for charging may result in less or more time interval availability for fleet member to charge. (which, again, could also apply to a single random EV/PHEV that is not in a fleet).

Figure 4B:
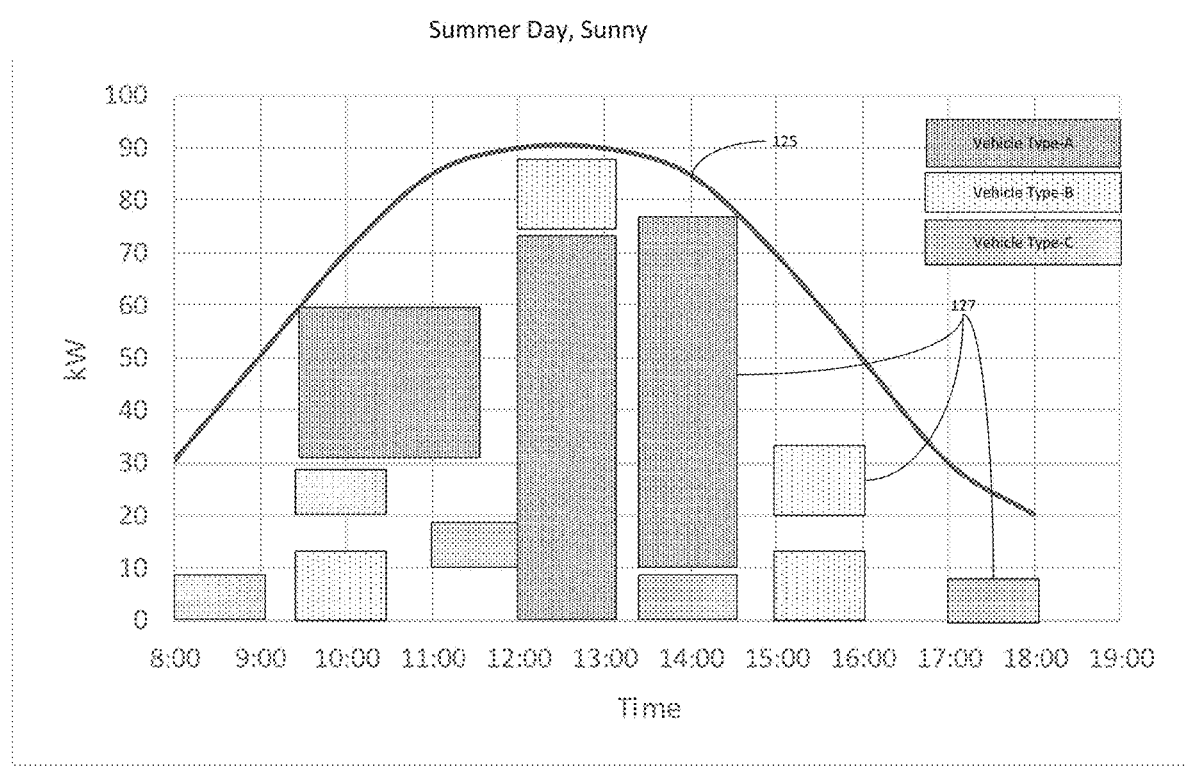
Figure 5:
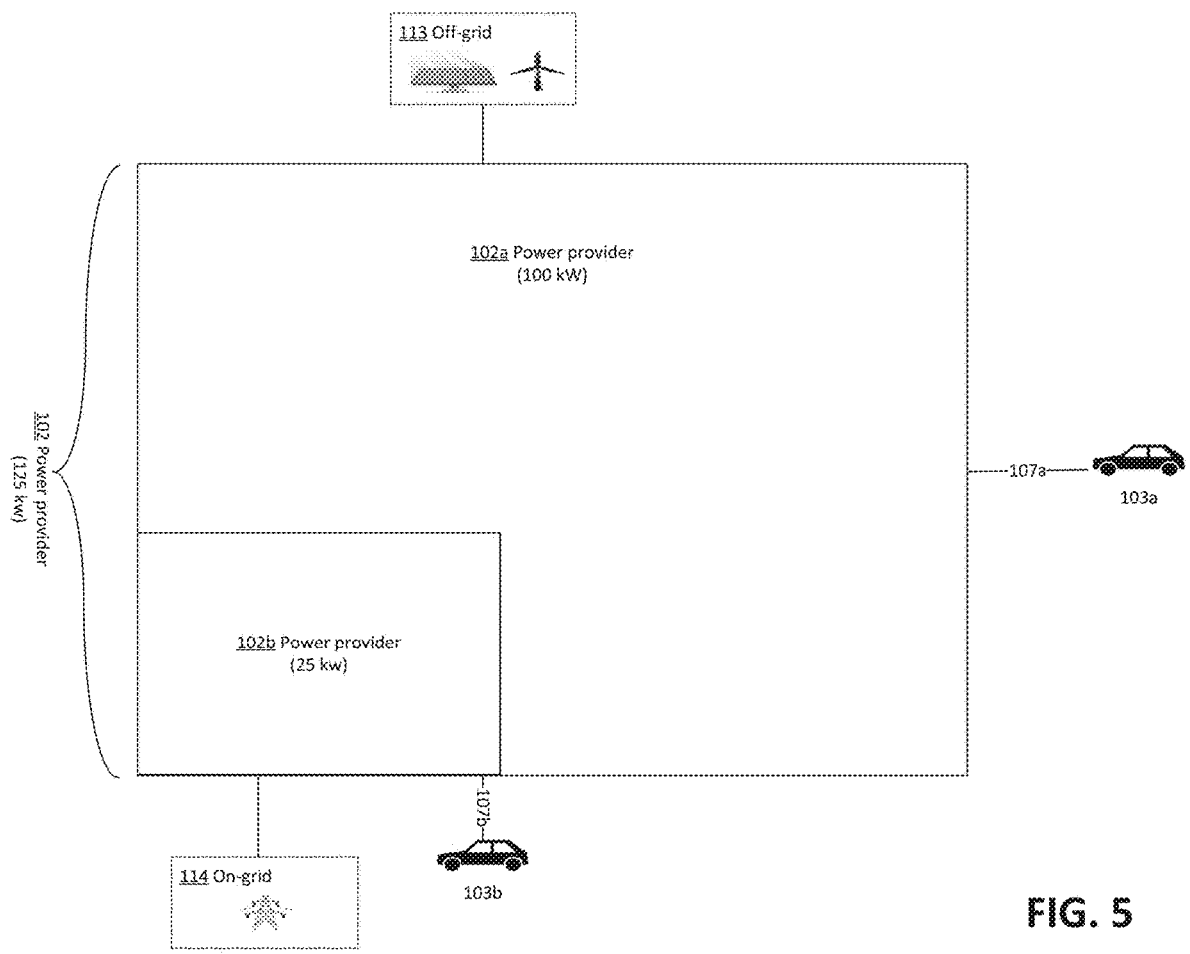
FIG. 5 shows managing energy demand across multiple energy sources.
Figure 6:
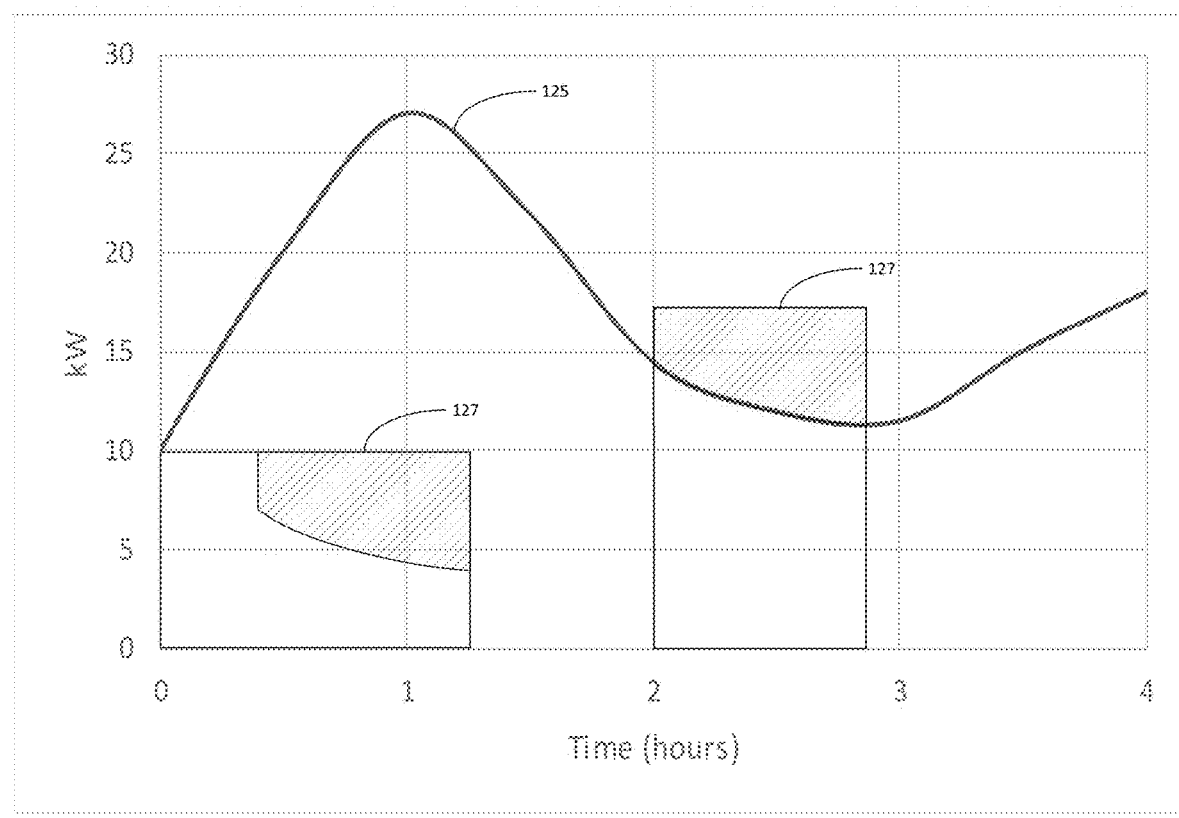
FIG. 6 shows allocation of energy from a device (e.g., vehicle) to power grid.

In such heightened situations where powered devices 103 form an aggregate group, the scheduled charging designations for individual powered device 103 within the group may need to be diverted to another designated geolocation (power provider 102), clock time, time interval h for powering, power level(s), and incentive energy pricing/rewards 129. In FIG. 4A or 4B, the shape-fitting of the aggregate end-user (fleet) end-user energy demand 127 may exceed provider net energy availability 125. Therefore, some powered devices 103 will need to be diverted to an alternative power provider 102 in order to have their end-user energy demand 127 met. In FIG. 5, two different fleet vehicles (powered device 103a and powered device 103b) are given different powering instructions. In the first instance, powered device 103a arrives at the scheduled geolocation (premises of power provider 102a, a 100 kW capacity solar array (out of total 125 kW) that is off-grid) at the scheduled clock time to receive electrical provider power 107a. However, powered device 103b, delayed, is forecasted by computing software 123 to fall outside provider net energy availability 125 of power provider 102a. Therefore, powered device 103b receives an update through third-party device management system 111 (e.g., fleet management software integrated with power management controller 101 through APIs 121) to go to a new geolocation (premises of power provider 102b, a 25 kW capacity solar array (out of a total 125 kW) that is on-grid) at an updated clock time to receive electrical provider power 107b. For powered device 103b, such charging may occur at suboptimal time for power provider 102b (e.g., peak hours) and therefore at negative incentive energy pricing/rewards 129b (e.g., at "demand charges").

In an alternate embodiment, any device or system in device power control system 100 may implement distributed ledger technology (aka "blockchain") tokens/cryptocurrencies for any purpose including auditing, tracking, payments, mining and the like.

In an alternate embodiment of device power control system 100, any power management device 106 and/or powered device 103, may include anti-theft and camera add-ons; and hardening against Electromagnetic pulse (EMP), solar flare and other fluctuations.

In an alternate embodiment, power management device 106 containing power controller/regulator 105 may replicate in design the appearance of a contemporary gasoline fuel pump with device user-interface 112 as the screen display displaying choices of power levels (amperage) being provided to power end-user 104 in the same way as different grades of gasoline (octane) are presented (e.g., the ability to select a number, say 3-5, options with corresponding price displayed) albeit with electric "fueling" options (e.g. 15-amp, 30 amp, and 40-amp charge intensities, and corresponding incentive energy pricing/rewards 129 displayed as price per e-Gallon™, e-Liter™; and the like). The device user-interface 112 may also include audio speaker/microphone (e.g., Amazon® Alexa® or Google® type capabilities), which together with the screen display (e.g., touch-screen or other touch-based capabilities), may enable end-user to select incentive energy pricing/rewards 129 and corresponding power level. Such power management device 106 may also include a retractable cord, retractable holster or cable holder.

In an alternate embodiment, a charging cable may connect power management device 106 containing power controller/regulator 105, to powered devices 103. The charging cable may include one or more Light-emitting diodes (LEDs) integrated within the charging cable. For example, the LEDs may span the length of the charging cable and serve both safety and security purposes, as well as convey information on charging and status. The charging cable may include a processor device programmed to control color, speed and/or direction of the lighting, with specific functions including time of day, motion sensors, improper or accidental unplug, charging speed, charging direction, battery state of charge, and the like.

In an alternate embodiment, power management controller 101 may, via communication module 116 (e.g., radio frequency (RF) or smart-home API such as MyQ), enable power management device 106 containing power controller/regulator 105 (e.g., EV/PHEV charging station) or powered device 103 (e.g., EV/PHEV) to communicate with a garage door opener or ventilation system. Specifically, for a PHEV, when V2G (vehicle-to-grid) activity is initiated by the power management device 106 containing power controller/regulator 105, it may be necessary to ventilate an enclosed space where the PHEV is located in order to avoid buildup of emissions from the exhaust of the PHEV.

In an alternate embodiment, the integration of solar panels onto a powered device 103 (e.g., an automobile windshield sunshade) may be enabled, through USB or some type of power connection, to send electrical power from the sunshade into a battery of powered device 103 (e.g., EV/PHEV). The characteristics of sunshade energy capacity, along with relevant auxiliary data 128 (sun forecasts, cloud cover, etc.) can be factored in by computing software 123 in processing/server units 117, in computations and shaping of provider net energy availability 125.

In an alternate embodiment, device power control system 100 may enable a synthetic manual transmission for EVs/PHEVs, i.e., a transmission in an EV/PHEV that mimics the function and feel of a standard manual transmission in an ICE vehicle, including the synchronizing of gear shifts and electronic throttling to vehicle speed. The result—current tapering at "top gear" maximizing efficiency and range; more time spent coasting at a steady power level; upshifting alerts to the vehicle's electronic control unit when to throttle; and downshifting alerts when to regen—may mitigate power level usage peaks and valleys thereby achieving load smoothing/shaping.

In an alternate embodiment, where powered device 103 has electrical charging, discharging and storage capabilities (e.g., EV/PHEV, unmanned aerial systems, manned aerial pack, agricultural/irrigation equipment, and the like) device device power control system 100 may support D2X system 115. For example, an EV/PHEV powered device 103 may send, through an inverter in powered device 103 or through a stand-alone inverter (e.g., in power management device 106, i.e., EV/PHEV charging station), electrical D2X power 130 to an off-grid provider 113 (e.g. a micro-premises such as a home, business, or other facility), to the centralized on-grid provider 114, or to another powered device 103. Such bi-directional energy transfer capabilities utilizing and integrating device power control system 100, may facilitate optimal matching of energy demand and availability shapes, in both directions to mitigate demand fluctuations.

In an alternate embodiment, various powered devices 103, each containing power controller/regulator 105 (e.g., heat pumps, electrical furnaces, A/C units, hot water heaters, and the like), may coordinate and schedule, through power management controller 101, their energy demand and availability shapes with each other for additional demand-load balancing optimization. In another variant, various powered devices 103 (e.g., lawn/garden equipment, power tools, drones, E-bikes, E-scooters, distributed ledger technology (DLT) mining systems, and the like) may coordinate and schedule electrical powering amongst themselves through physical plugs/connectors connected to, and/or through wireless electricity linked with, power management device 106 that contains power controller/regulator 105 and that utilizes device power control system 100.

In an alternate embodiment, powered device 103 and/or power management device 106 containing power controller/regulator 105 may be configured to transfer electrical power through wireless charging (e.g., induction, magnetic resonance, and the like), either unidirectionally or with D2X capability. Specifically, such wireless charging devices may be integrated into moveable platforms for powered devices 103 (e.g., electric vehicles), including auto-shop lifts for underbody work, 'car elevators', and the like. For example, a large number of autonomous electric vehicles (AEVs) may be stored in a parking garage which may operate as a large-scale powerplant/battery though integration of wireless charging and D2X capability. In a specific example, light electric vehicles (e.g., e-bikes, scooters, motorcycles and the like) may thus be charged wirelessly through direct induction or contact charging via a mechanical coupling with the power management device 106 containing power controller/regulator 105 such that it receives and retains one or more wheels of the light electric vehicle with no need for external cords or plugs.

In an alternate embodiment, power management controller 101 and power controller/regulator 105 may not be connected to a stationary power provider 102 but rather to a system of at least one independent, mobile power provider 102 (e.g., solar panels, turbines, batteries and other energy storage/power generation capable equipment), to provide electrical D2X power 130 via a mobile system. For example, the energy storage/power generation equipment, power management controller 101 and power controller/regulator 105 may be placed on another vehicle or towable trailer that is then capable of powering powered devices 103 (e.g., EVs, PHEVs, agricultural/farm equipment and the like) in the field.

In an alternate embodiment, the device power control system 100 may provide recorded powering/charging data to an exit monitoring device in a parking area (e.g., lot, garage and the like) which may be configured to print the charging data (e.g., charging time intervals, incentive pricing paid, etc.) on a parking ticket stub/receipt such that any fee for charging a powered device 103 (e.g., EV/PHEV and the like) may be added to the cost for parking powered device 103. In another variant, a parking ticket issued upon entry in a parking area, can be inserted into power management device 106 containing power controller/regulator 105 (e.g., public charging station for EVs/PHEVs) to automatically factor in parking fee in the calculation of incentive energy pricing/rewards 129 for the powering of the EV/PHEV.

Figure 7:
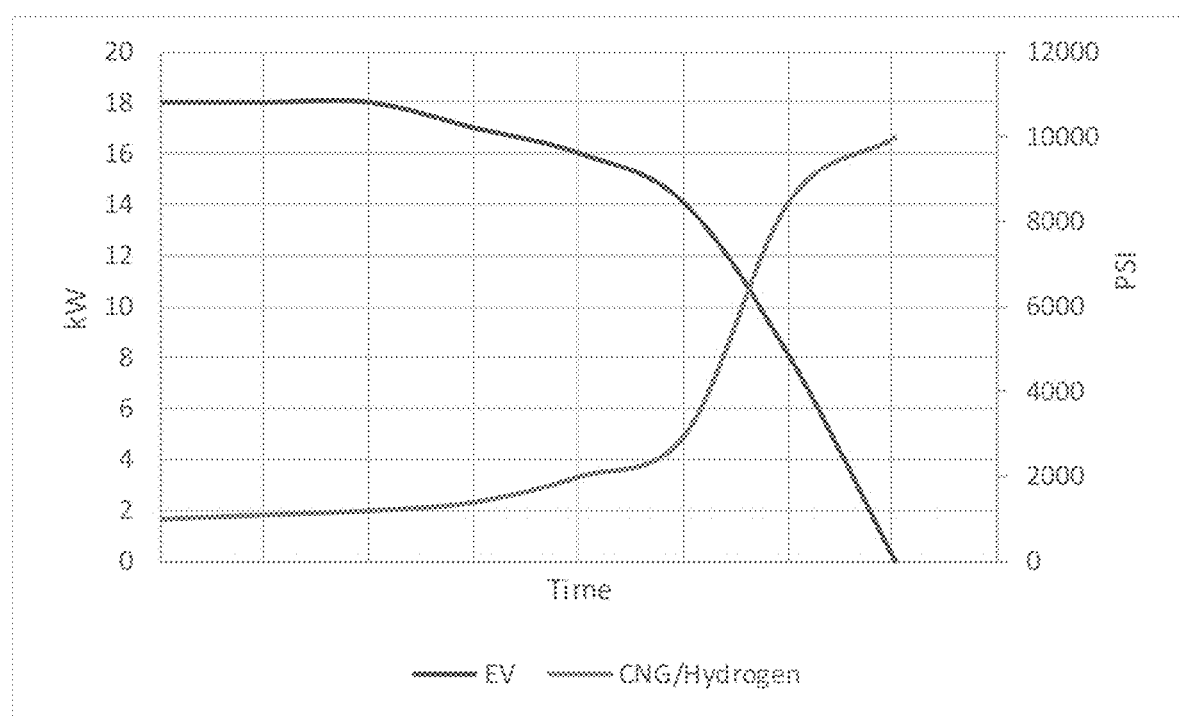
FIG. 7 shows synchronizing energy demand shapes to be the inverse of each other.

In an alternate embodiment, the electrical powering/charging of a powered device 103*a* may be coordinated in an operation powering/charging another powered device 103*b*, such that together the power requirements of both may shaped so that one is the inverse of the other. For example, the high power requirements of a first powered device 103*b* (e.g. a compressor for the pre/re-pressurization of gaseous fuels for a gaseous fuel charging station, including but not limited to compressed natural gas (CNG), hydrogen (H2), and the like), may be scheduled in coordination with the high-power charging requirements of a second first powered device 103*a* (e.g. EVs/PHEVs, UAVs and the like). When powered device 103*a* is connected to a power management device 106 containing power controller/regulator 105 (e.g., DC charging station), the power level requirement may be highest at the beginning of the charging cycle up to approximately 80% full charge at which point the charging power level may begin to taper off. At the same time, in contrast for powered device 103*b*, the power level requirements to pre/re-pressurize gaseous fuels at very high levels (e.g., 10,000 psi or greater) can be ramped up in coordination with the tapering of the power requirement for powered device 103*a*. The result, as shown in FIG. 7 is that synchronizing the end-user energy demand 127 shapes of both powered device 103*a* and powered device 103*b* optimizes their combined shape-fitting with the provider net energy availability 125 shape, by eliminating peaks and valleys and achieving demand load smoothing/shaping.

In an alternate embodiment, power management device 106 may include a flex-fuel blender pump configured to provide powered device 103 such as a plug-in hybrid electric vehicle (PHEV) with fuel. The power management controller 101 may be configured to record, as auxiliary data 128 in database 124, usage data of the PHEV powered device 103. For example, the driving data including speed, acceleration, HVAC use, braking, and the like, may be obtained via any one or all of OS/software/firmware 109 internal to the PHEV powered device 103 (e.g., Apple CarPlay, Android Auto), diagnostic device 108 (e.g., an OBD) connected to the PHEV powered device 103, and/or third-party device management system 111 integrated with PHEV powered device 103. Such usage data along with current fuel pricing data for two or more different liquid fuels (gasoline, ethanol, methanol, butanol, etc.), obtained from auxiliary data 128, may be analyzed by computing software 123 in processing/server units 117 to determine an optimized fuel mixture of two or more fuels, for selection by power end-user 104. The power end-user 104 may also manually specify, via device user-interface 112 (e.g., touchscreen) on the flex-fuel blender pump power management device 106, the amount of fuels in any percentage(s) up to a combined total of 100%; from revised displays of pricing and fuel-type ratios, power end-user 104 may make a selection that will result in power management device 106 dispensing the fuel correspondingly. Savings, if any, between pricing in recommended and manual choices may be recorded in database 124 and behaviorally optimized in future transactions.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A power transmission and modulation control system comprising:
    at least one processor device;
    at least one data storage device;
    at least one communications module; and
    one or more instructions stored in the at least one data storage device that, when executed by the at least one processor device, program the at least one processor device for:
        receiving, from a power provider associated with a geolocation though location determination protocols, via the communications module, provider net energy availability data indicative of energy available from the power provider over a time interval based on the geolocation;
        receiving, via the communications module, end-user energy demand data indicating: an amount of energy to be provided to a battery of an electric vehicle; and a user-inputted end-time by which the amount of energy is to be provided to the battery;
        determining one or more time intervals, prior to the end-time, within the provider net energy availability data, over which the amount of energy to be provided to the battery can be allocated;
        receiving, from the power provider, via the communications module, provider energy pricing data indicative of a cost to obtain energy from the power provider;
        determining, from the provider energy pricing data, one or more incentive pricing values associated with the one or more time intervals;
        receiving a user input selecting an incentive pricing value of the one or more incentive pricing values;
        selecting a time interval from the one or more time intervals within the provider net energy availability data which corresponds to the user input selecting the incentive pricing value; and
        controlling a power regulator of a power management device to provide the amount of energy to the battery over the selected time interval.

2. The power transmission control system of claim 1, wherein the receiving, from a power provider, via the communications module, provider net energy availability data indicative of energy available from the power provider over a time interval includes:
    receiving power-time continuum data corresponding to energy available from the power provider.

3. The power transmission control system of claim 2, wherein the receiving, via the communications module, end-user energy demand data indicating: an amount of energy to be provided to a battery of an electric vehicle; and an end-time by which the amount of energy is to be provided to the battery includes: receiving power-time continuum data corresponding to the amount of energy to be provided to the battery.

4. The power transmission control system of claim 3, wherein the determining one or more time intervals, prior to the end-time, within the provider net energy availability data, over which the amount of energy to be provided to the battery can be allocated includes:
    fitting the power-time continuum data corresponding to the amount of energy to be provided to the battery into the power-time continuum data corresponding to energy available from the power provider.

5. The power transmission control system of claim 1, wherein the receiving, from a power provider, via the communications module, provider net energy availability data indicative of energy available from the power provider over a time interval includes:
    receiving geolocation data associated with a location of the electric vehicle; and
    receiving power-time continuum data corresponding to energy available from the power provider to be provided via a power regulator of a power management device co-located at the location of the electric vehicle.

6. The power transmission control system of claim 1, wherein the receiving, via the communications module, end-user energy demand data indicating: an amount of energy to be provided to a battery of an electric vehicle; and an end-time by which the amount of energy is to be provided to the battery includes:

receiving at least one of: a user inputted amount of energy to be provided to the battery; or a user inputted end-time by which the amount of energy is to be provided to the battery.

7. The power transmission control system of claim 1, wherein the receiving, via the communications module, end-user energy demand data indicating: an amount of energy to be provided to a battery of an electric vehicle; and an end-time by which the amount of energy is to be provided to the battery includes:

receiving, a computing system-defined amount of energy to be provided to the battery; or computing system-defined end-time by which the amount of energy is to be provided to the battery.

8. The power transmission control system of claim 1, wherein the receiving, via the communications module, end-user energy demand data indicating: an amount of energy to be provided to a battery of an electric vehicle; and an end-time by which the amount of energy is to be provided to the battery includes:

receiving, via the communications module, end-user energy demand data indicating one or more identifying characteristics of the electric vehicle; and retrieving, from memory, energy demand data associated with the one or more identifying characteristics of the electric vehicle.

9. The power transmission control system of claim 1, wherein the receiving, via the communications module, end-user energy demand data indicating: an amount of energy to be provided to a battery of an electric vehicle; and an end-time by which the amount of energy is to be provided to the battery includes:

receiving, via the communications module, end-user energy demand data indicating an amount of energy to be provided to two or more electric vehicles.

10. The power transmission control system of claim 1, wherein the determining, from the provider energy pricing data, one or more incentive pricing values associated with the one or more time intervals includes:

determining a first incentive pricing value associated with a first time interval of the one or more time intervals; and determining a second incentive pricing value, distinct from the first pricing value, associated with a second time interval of the one or more time intervals.

11. The power transmission control system of claim 1, wherein the selecting a time interval from the one or more time intervals within the provider net energy availability data which corresponds to the user input selecting the incentive pricing value includes:

selecting a time interval from the one or more time intervals which corresponds to a lowest cost to obtain energy from the power provider.

12. The power transmission control system of claim 1, wherein the selecting a time interval from the one or more time intervals within the provider net energy availability data which corresponds to the user input selecting the incentive pricing value includes:

selecting a time interval from the one or more time intervals which corresponds to a user-specified cost to obtain energy from the power provider.

13. The power transmission control system of claim 1, wherein the selecting a time interval from the one or more time intervals within the provider net energy availability data which corresponds to the user input selecting the incentive pricing value includes:

selecting a time interval from the one or more time intervals within the provider net energy availability data which corresponds to a user-selection of an energy source-type.

14. The power transmission control system of claim 1, wherein the selecting a time interval from the one or more time intervals within the provider net energy availability data which corresponds to the user input selecting the incentive pricing value includes:

selecting a time interval from the one or more time intervals within the provider net energy availability data which corresponds to a prior user-selection defining a user profile associated with the electric vehicle.

15. The power transmission control system of claim 1, wherein the electric vehicle comprises at least one of a plug-in electric vehicle (PEV) or a plug-in hybrid electric vehicle (PHEV).

16. The power transmission control system of claim 1, further comprising:

displaying, to the end user, the one or more incentive pricing values associated with the one or more time intervals.

17. A method for power transmission and modulation control comprising:

receiving, from a power provider associated with a geolocation though location determination protocols, via a communications module, provider net energy availability data indicative of energy available from the power provider over a time interval based on the geolocation;

receiving, via the communications module, end-user energy demand data indicating: an amount of energy to be provided to a battery of an electric vehicle; and a user-inputted end-time by which the amount of energy is to be provided to the battery;

determining one or more time intervals, prior to the end-time, within the provider net energy availability data, over which the amount of energy to be provided to the battery can be allocated;

receiving, from the power provider, via the communications module, provider energy pricing data indicative of a cost to obtain energy from the power provider;

determining, from the provider energy pricing data, one or more incentive pricing values associated with the one or more time intervals;

receiving a user input selecting an incentive pricing value of the one or more incentive pricing values;

selecting a time interval from the one or more time intervals within the provider net energy availability data which corresponds to the user input selecting the incentive pricing value; and controlling a power regulator of a power management device to provide the amount of energy to the battery over the selected time interval.

* * * * *